US008380391B2

(12) United States Patent
Baino

(10) Patent No.: US 8,380,391 B2

(45) Date of Patent: Feb. 19, 2013

(54) BANK ANGLE DETECTING DEVICE AND HEADLIGHT DEVICE FOR MOTORCYCLE

(75) Inventor: Makoto Baino, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 565 days.

(21) Appl. No.: 12/564,195

(22) Filed: Sep. 22, 2009

(65) Prior Publication Data

US 2010/0168958 A1 Jul. 1, 2010

(30) Foreign Application Priority Data

Dec. 25, 2008 (JP) ................................ 2008-329553

(51) Int. Cl.

*G06F 7/00* (2006.01)
*B60Q 1/00* (2006.01)
*F21V 21/28* (2006.01)
*F21V 21/29* (2006.01)
*F21V 1/00* (2006.01)

(52) U.S. Cl. ............ 701/36; 362/37; 362/464; 362/465; 362/466; 362/467

(58) Field of Classification Search .................... 701/36; 362/37, 464–467, 473, 475

See application file for complete search history.

(56) References Cited

U.S. PATENT DOCUMENTS 3,939,339 A * 2/1976 Alphen ......................... 362/467
4,024,388 A * 5/1977 Skoff ............................ 362/467
4,075,469 A * 2/1978 Alphen ......................... 362/467
4,868,720 A * 9/1989 Miyauchi et al. ............. 362/466
4,870,545 A * 9/1989 Hatanaka et al. ............. 362/466
4,922,390 A * 5/1990 Nakazawa et al. ............ 362/467
5,217,087 A * 6/1993 Ikegami et al. ............... 180/219
6,193,398 B1 * 2/2001 Okuchi et al. ................ 362/466
8,260,505 B2 9/2012 Peeters et al.
2007/0086203 A1 * 4/2007 Nakano et al. ................ 362/514
2009/0103319 A1 4/2009 Peeters et al.

FOREIGN PATENT DOCUMENTS

JP 06-273444 9/1994
JP 2004-155404 6/2004
WO 2007/107935 9/2007

OTHER PUBLICATIONS

Japanese Patent Application No. 2008-329553 Decision to Grant dated Nov. 6, 2012, 3 pages.

* cited by examiner

*Primary Examiner* — James Trammell
*Assistant Examiner* — Daniel L Greene

(57) ABSTRACT

A bank angle detecting device includes a roll rate sensor for detecting a angular velocity ωr about a longitudinal axis of the motorcycle; a yaw rate sensor for detecting a angular velocity ωy about an vertical axis of the motorcycle; a bank angle detecting unit for detecting the motorcycle bank angle δ for calibration use based on the yaw rate ωy and a traveling velocity v; and a bank angle correcting unit for correcting the basic motorcycle bank angle δr, determined from an output ωr of the yaw rate sensor, so as to approach the motorcycle bank angle δ that is detected by the bank angle detecting unit, to thereby determine the estimated bank angle δ0.

16 Claims, 9 Drawing Sheets

ESTIMATED BANK ANGLE δ0
19
60
65
66
64
63
62
59
BANK ANGLE DETECTING UNIT
δ=sin⁻¹(v·ωy/δ)
δ-δ0
1/T
ωr
(d/dt δr)
ωy
v
δ
55
ROLL RATE SENSOR
56
YAW RATE SENSOR
57
VELOCITY SENSOR

BANK ANGLE DETECTING DEVICE AND HEADLIGHT DEVICE FOR MOTORCYCLE

CROSS REFERENCE TO THE RELATED APPLICATION

This application is based on and claims Convention priority to Japanese patent application No. 2008-329553, filed Dec. 25, 2008, the entire disclosure of which is herein incorporated by reference as a part of this application.

BACKGROUND OF THE INVENTION

1. Field of the Invention

The present invention relates to a bank angle detecting device for detecting, with a high accuracy, an angle of banking of a motorcycle during cornering of the latter and a headlight device for such motorcycle.

2. Description of the Related Art

During the travel of a motorcycle, the motorcycle generally makes the curve with its body being banked. However, considering that the headlight used in most motorcycles now available in the market is fixed in position to the motorcycle frame structure and, therefore, the region of illumination cast by the motorcycle headlight is correspondingly tilted as the motorcycle is banked, the amount of light distributed by the motorcycle headlight in an area inwardly of the direction of movement of the motorcycle, in which the motorcycle rider's eyes are focused, particularly during the cornering at night decreases during the cornering, with the rider's field of view forwardly of the direction of travel narrowed consequently.

More specifically, referring to FIG. 13 showing the forward field of view available to the motorcycle rider during the straight forward drive at night, the region of illumination A cast by the motorcycle headlight upon an area of the road surface forwardly of the motorcycle spreads in leftward and rightward directions of the motorcycle, which are parallel to the horizontal datum line H. However, as best shown in FIG. 14, when the motorcycle makes the curve in a leftward direction along a curved lane 80 as shown by the arrow-headed line P therein, the motorcycle makes a cornering while being tilted at a certain bank angle and, therefore, the region of illumination A cast similarly by the motorcycle headlight on an area of the road surface tilts downwardly leftward as compared with the region of illumination A exhibited during the straight forward run of the motorcycle. Therefore, a forward portion of the road surface inwardly of the direction of turn of the motorcycle (as indicated by the dotted circle B in FIG. 14), where the motorcycle rider's eyes are generally focused during the cornering encompasses less portion of the region of illumination A than that during the straight forward run, with the consequence that the rider's field of view forwardly of the direction of cornering is virtually narrowed.

In view of the foregoing, the headlight device capable of resolving the foregoing problems and inconveniences has been suggested, in which based on the bank angle of the motorcycle detected by a bank angle detecting unit, the lens and the light emitting element of the headlight can be pivoted or rotated about the optical axis of the headlight in a direction counter to the direction of tilting of the motorcycle. (In this connection, see, for example, the JP Laid-open Patent Publication No. 2004-155404 published Jun. 3, 2004.) With this suggested headlight device, as shown in FIG. 12, a forward portion of the road surface inwardly of the direction of turn of the motorcycle (as indicated by the dotted circle B in FIG. 12), where the motorcycle rider's eyes are generally focused during the cornering, can encompass more region of illumination A, with the rider's field of view forwardly of the direction of cornering increased consequently.

The bank angle detecting unit employed in the motorcycle headlight device such as discussed above is made up of a headlamp module for illuminating the forward area of the motorcycle, a light distribution adjusting mechanism for changing the region of illumination cast by the headlamp module, a bank angle detecting unit for detecting the bank angle of the motorcycle in reference to the rotatory angular velocity (yaw rate) about a vertical axis of the motorcycle, the motorcycle traveling velocity and an acceleration in a lateral direction of the motorcycle, and a light distribution control unit for controlling the light distribution adjusting mechanism based on the detected bank angle to change the region of illumination so that a far area inwardly of the direction of turn of the motorcycle during the cornering. As the bank angle detecting unit, a yaw rate sensor such as, for example, a gyro is employed and the bank angle δ can be obtained from the following equation (1), in which the traveling velocity is expressed by v, the acceleration of gravity is expressed by g and the yaw rate is expressed by ωy:

$$\delta=\sin^{-1}(v\cdot\omega y/g) \qquad (1)$$

When the headlamp module is turned an angle, corresponding to the bank angle δ so determined by the equation (1) above, in a direction counter to the bank angle δ, the relatively large region of illumination by the headlamp module effective to increase the rider's field of view forwardly of the direction of cornering is obtained.

It has, however, been found that the bank angle δ that can be determined by the above discussed equation (1) is a static bank angle and, therefore, when affected by a pitching of the motorcycle body at the start of banking of the motorcycle or during acceleration resulting from opening or closure of an accelerator during banking, the change tends to become considerable. In other words, the bank angle δ changes at a short cycle. It may accordingly occur that if the headlamp module is rotated in a direction counter to the bank angle in accordance with the bank angle δ so varying as discussed above, the headlamp module itself will move at a correspondingly short cycle, resulting in unnatural or uncomfortable sensation to the rider.

SUMMARY OF THE INVENTION

In view of the foregoing, the present invention has for its primary object to provide a bank angle detecting device for a motorcycle, in which the bank angle of the motorcycle can be accurately detected with a minimized change.

Another important object of the present invention is to provide a headlight device capable of changing the region of illumination by a headlamp module to secure a relatively large field of view at all times during the motorcycle cornering, without causing any motorcycle rider to feel unnatural or uncomfortable.

In order to accomplish these objects of the present invention, the present invention provides a bank angle detecting device for a motorcycle, which includes a roll rate sensor for detecting a angular velocity about a longitudinal axis or a forward and rearward axis of the motorcycle; a yaw rate sensor for detecting a angular velocity about a vertical axis or an up and down axis of the motorcycle; a bank angle detecting unit for detecting a motorcycle bank angle for calibration use based on the angular velocity, detected by the yaw rate sensor, about the vertical axis of the motorcycle, and a traveling velocity of the motorcycle; and a bank angle correcting unit for correcting a basic motorcycle bank angle, determined from an output of the yaw rate sensor, so as to approach the motorcycle bank angle for calibration use that is detected by the bank angle detecting unit, to thereby determine an estimated bank angle.

According to the present invention, the basic motorcycle bank angle that is determined from an output of the roll rate sensor, which is susceptible to a drift but involves a minimized change at a short cycle, is corrected by the bank angle correcting unit to cause it to approach the motorcycle bank angle for calibration use that is detected by the bank angle detecting unit having a minimized drift. Accordingly, the estimated bank angle accurate, but having a minimized change at the short cycle can be obtained.

In the practice of the present invention, the bank angle correcting unit referred to above may preferably include a dividing circuit for dividing a difference between an output of the bank angle detecting unit and the estimated bank angle by time, an adding circuit for adding an output of the dividing circuit and the output of the roll rate sensor together, and an integrating circuit for integrating an output of the adding circuit to provide the estimated bank angle.

With these circuits, when "time" used in the dividing circuit is shortened, the output of the bank angle detecting unit that has been divided by time increases and, accordingly, where it is added to an output of the roll rate sensor by means of the adding circuit, the weight of an output of the bank angle detecting unit, which has a small drift, can be increased. On the other hand, if "time" is prolonged, the output of the bank angle detecting unit, which has been divided by time, decreases and, accordingly, where it is added to the output of the roll rate sensor by means of the adding circuit, the weight of the output of the roll rate sensor, which has a minimized change in short cycle, can be increased. Although the output of the adding circuit is outputted as an estimated bank angle as a result of integration performed by the subsequent integrating circuit, an output of the integrating circuit is fed back to an input of the dividing circuit and, therefore, an undesirable drift of the estimated bank angle resulting from influence brought about by a zero point offset and/or an integration error can be suppressed as much as possible and the change in short cycle can also be suppressed to provide the accurate bank angle.

In a preferred embodiment of the present invention, the use may be made in the bank angle detecting device of a pitch angle detecting unit for detecting a angular velocity of the motorcycle about a lateral axis or a leftward and rightward axis, and a pitching correcting unit for correcting the respective angular velocities about the vertical axis and the longitudinal axis based on the rotatory angle about the lateral axis, which has been detected by the pitch angle detecting unit.

In general, change in pitch angle of the motorcycle incident to nose diving or nose lifting, which occurs during the motorcycle being braked or accelerated, tends to affect the roll rate and the yaw rate, but the additional use of the pitch angle detecting unit and the pitching correcting unit in the bank angle detecting device as discussed above is particularly advantageous in that when such change in pitch angle is detected by the pitch angle detecting unit as a rotatory angle (pitch angle) about the lateral axis and, based on the resultant pitch angle, the angular velocities about the longitudinal axis and the vertical axis of the motorcycle can be corrected by the pitching correcting unit. Accordingly, the highly accurate bank angle can be detected.

The pitch angle detecting unit referred to above may be of a type capable of determining the rotatory angle (pitch angle) about the lateral axis from an amount of telescopic motion of a suspension unit for each of front and rear wheels of the motorcycle. In such case, since respective suspension units for front and rear wheels, which are members employed in any existing motorcycle, can be effectively utilized, the pitch angle can be obtained at a low cost with high precision. Where none of those suspension units are utilized, the pitch angle detecting unit referred to above may determine the pitch angle from the acceleration acting in the longitudinal direction. In such case, the acceleration sensor may be arranged at a location proximate to the center of gravity of the motorcycle so that the highly accurate pitch angle can be obtained.

The present invention also provides a headlight device for a motorcycle, which includes a bank angle detecting device as defined hereinabove; a headlamp module for illuminating an area forwardly of the motorcycle; a light distribution adjusting mechanism for changing a region of illumination afforded by the headlamp module; and a light distribution control unit for controlling the light distribution adjusting mechanism based on the estimated bank angle to thereby change the region of illumination to allow the headlamp module to illuminate a further region inwardly of a direction of turn during cornering of the motorcycle.

According to the present invention, the estimated bank angle can be detected accurately by the bank angle detecting device. The light distribution control unit is operable in response to the detected motorcycle bank angle to control the light distribution adjusting mechanism so that during the cornering of the motorcycle, a region of illumination (light distribution) afforded by the headlamp module can be altered to illuminate a region forwardly of the motorcycle with respect to the direction of turn of the latter, that is, a further region forwardly of the motorcycle and on one side adjacent the center of turn of the motorcycle.

In a preferred embodiment of the present invention, the light distribution control unit employed in the headlight device of the type referred to above may be so designed and so configured as to control the light distribution adjusting mechanism based on a correlation between the traveling velocity and the estimated bank angle, in addition to the estimated bank angle.

With this configuration the light distribution control unit can automatically and properly adjust the region of illumination. For example, when three running modes are set to include a normal running mode during which the motorcycle is driven at a normal speed; a sports running mode during which the motorcycle is driven at a high speed; and a slow running mode during which the motorcycle is driven at a slow speed and such one of the three running modes of the motorcycle is determined according to one of the previously described three correlations. In this example, during the sports running mode during which the motorcycle rider tends to watch attentively in a further region forwardly of the motorcycle than that during the normal running, the region of illumination may be turned a larger angle than that during the normal running, but during the slow running, the region of illumination may be turned a smaller angle than that during the normal running.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A preferred embodiment of the present invention will now be described in detail with reference to the accompanying drawings.

Figure 1:
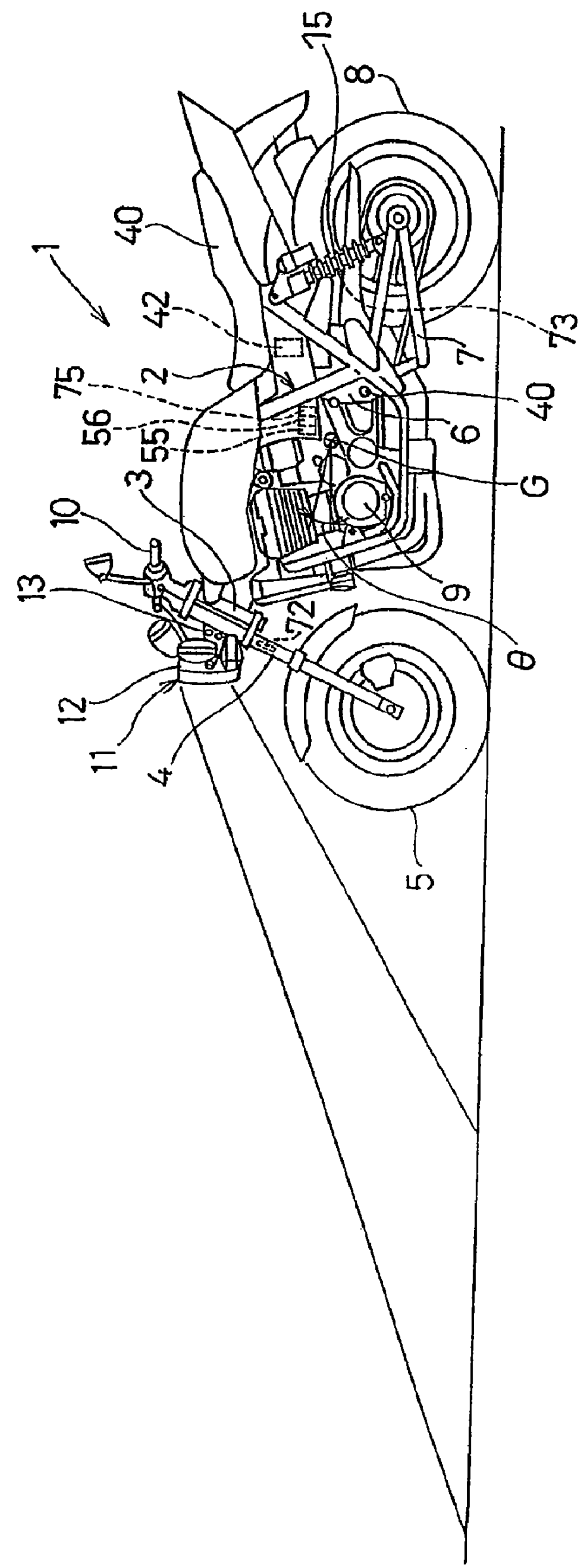
FIG. 1 is a schematic side view showing a motorcycle provided with a headlight device equipped with an bank angle detecting unit according to a first preferred embodiment of the present invention.

FIG. 1 illustrates a schematic side view of a motorcycle equipped with a headlight device utilizing a bank angle detecting device of the present invention. The motorcycle 1 shown therein includes a motorcycle frame 2 having a head tube 3 secured to a front end thereof. The head pipe 3 rotatably supports a front fork 4 having left and right fork members, with a front wheel 5 being rotatably supported by respective lower ends of the left and right fork members. The motorcycle frame 2 also includes a swingarm bracket 6, with which an swingarm 7 is connected through a pivot pin 40 for pivotal movement up and down about the pivot pin 40. This swingarm 7 carries a rear drive wheel 8 rotatably supported by a rear end thereof. A motorcycle combustion engine 9 is mounted on the motorcycle frame 2 at an intermediate lower portion thereof and is drivingly coupled with the rear wheel 8 by means of a substantially endless drive chain. A steering handlebar 10 is mounted on an upper end of the front fork 4 for maneuvering the motorcycle 1. A rear wheel suspension device 15 is mounted in between the swingarm 7 and the motorcycle frame 2.

A headlamp module 12, forming a part of the headlight device 11, is fitted to the front fork 4 through a headlight bracket 13. It is, however, to be noted that in the case of the motorcycle having a front fairing, the headlamp module 12 may be fitted to the motorcycle frame through the front fairing. In addition to the headlamp module 12, the headlight device 11 includes, as shown in a circuit diagram in FIG. 3, a drive unit 18 incorporated in the headlamp module 12, an encoder (a rotational position detecting unit) 29, a bank angle detecting device 19 and a light distribution control unit 20.

Figure 2:
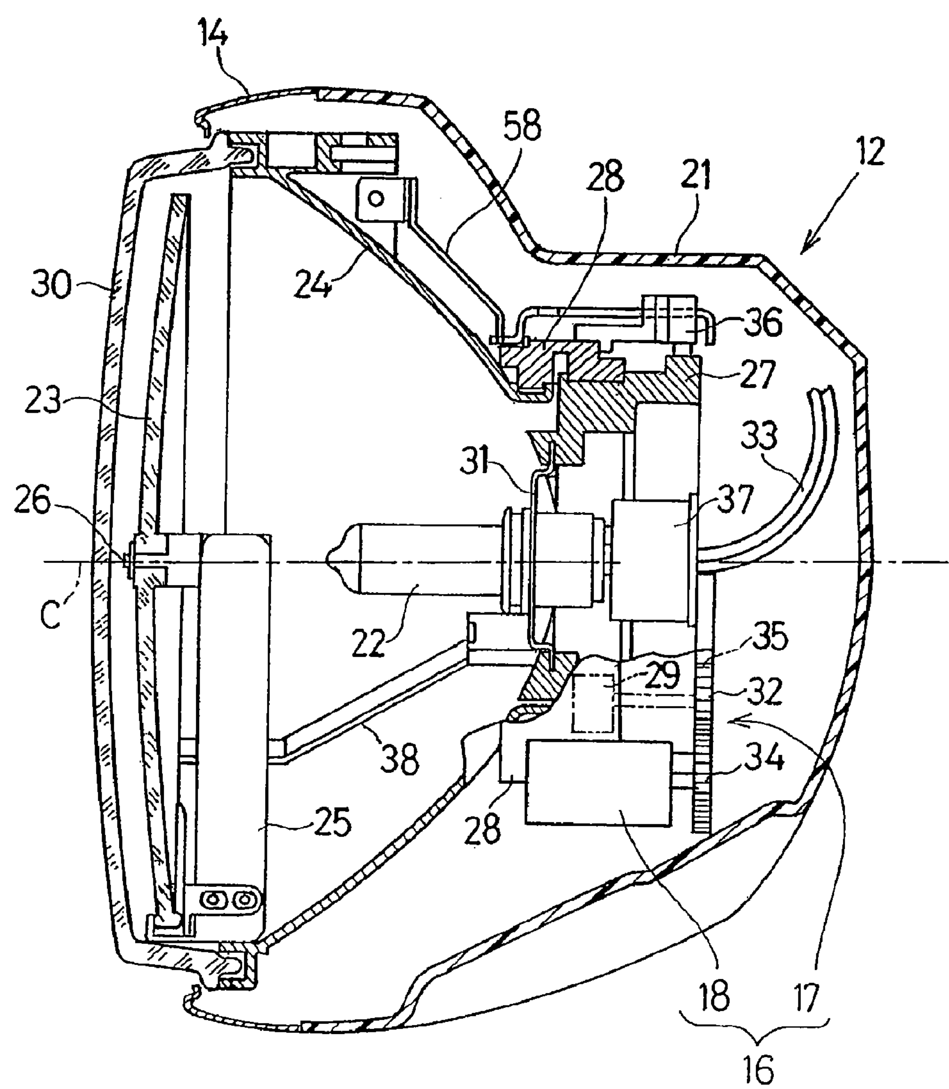
FIG. 2 is a longitudinal sectional view showing the headlight unit employed in the headlight device.

FIG. 2 illustrates a longitudinal sectional view of the headlamp module 12. As shown therein, the headlamp module 12 includes a headlight casing 21, a bulb 22 as an example of a light emitting element disposed inside the headlight casing 21, a lens 23 disposed in face-to-face relation with the bulb 22, and an illuminating region changing mechanism 17. A combination of the bulb 22 with the lens 23 is supported rotably about a center axis C thereof by the illuminating region changing mechanism 17.

Specifically, the headlight casing 21 has a front opening open in a direction forwardly of the motorcycle 1, and an annular rim member 14 is fitted to a front open edge portion of the headlight casing 21 by means of a plurality of set screws (not shown). A generally bowl-shaped reflector 24 for reflecting rays of light from the bulb 22 towards the lens 23 and then to the outside of the headlight casing 21 is fitted to the annular rim member 14 by means of hooks and set screws (both not shown) while disposed inside the headlight casing 21 so as to surround the bulb 22. The lens 23 referred to above is supported by a rotary spindle 26 of an elongated lens support 25, mounted fixedly on the reflector 24, for rotation about the rotary spindle 26. A rotary base 27 is arranged in a center area of the reflector 24 in coaxial relation with the lens 23, and the bulb 22 referred to above is fitted to a center portion of the rotary base 27 through a bulb bracket 31 in coaxial relation with the center axis C.

The rotary base 27 is rotatably supported by a fixed base 28 positioned substantially radially outwardly of the rotary base 27 and the fixed base 28 is in turn supported by the reflector 24 through a bracket 58. The rotary base 27 and an outer peripheral portion of the lens 23 are connected with each other by means of one or more arms 38 extending therebetween. Accordingly, that combination of the bulb 22 and the lens 23 is rotatable relative to the headlight casing 21, the annular rim 14 and the reflector 24. A front transparent cover 30 is fitted to a front edge portion of the reflector 24. As a matter of design, a bulb socket 37 for receiving therein a mouthpiece of the bulb 22 to support the latter has an electric power supply cable 33 connected therewith.

A portion of an outer periphery of the rotary base 27 is formed with an arcuately extending driven gear segment 32, which extends about 180° about the center axis C of rotation thereof, and, on the other hand, an outer peripheral portion of the fixed base 28 has a drive unit 18 mounted thereon for driving the rotary base 27. The drive unit 18 is in the form of, for example, a DC drive motor. The outer peripheral portion of the fixed base 28 is also provided with an encoder 29 for detecting the angle of rotation of the rotary base 27 and, hence, the angle of rotation of the combination of the lens 23 and the bulb 22. The encoder 29 is positioned at a location spaced circumferentially from the drive unit 18. This drive unit 18 is drivingly coupled with the rotary base 27 through a round drive gear 34 and then through the driven gear segment 32 integral with the rotary base 27. Accordingly, when the drive unit 18 is activated, the combination of the lens 23 and the bulb 22 can be turned about the center axis C.

It is to be noted that the drive unit 18 and the illuminating region changing mechanism 17 referred to previously to turn the lens 23 and the bulb 22 cooperate with each other so as constitute a light distribution adjusting mechanism 16.

The encoder 29 has a round transmission gear 35 that is meshed with the driven gear segment 32 and can therefore undergo a rotation to detect the number of revolutions (numerical amount) or angle of rotation of the drive unit 18 and, in turn, to detect the angle of rotation of the combination of the lens 23 and the bulb 22 based on the detected number of revolutions or angle of rotation of the drive unit 18. The transmission gear 35 has the number of gear teeth, equal to that of the drive gear 34, and can therefore rotate in the number of revolutions equal to that of the drive gear 34. The fixed base 28 has a limit switch 36 fitted thereto for halting the drive unit 18 when the number of revolutions of the rotary base 27 is detected as exceeding a predetermined range of angle. Electric power supply cables or signal transmission cables connected with the drive unit 18, the encoder 29 and the limit switch 36, as well as the electric power supply cable 33 for the bulb 22, are led out of the headlight casing 21 through a cable lead-out hole (not shown) defined in the headlight casing 21.

Figure 13:
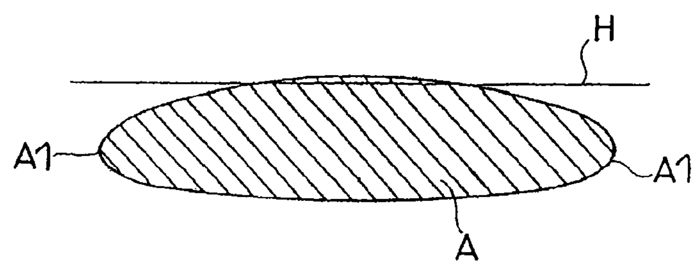
FIG. 13 is a schematic forward viewed diagram showing the region illuminated by the headlight device during the straightforward travel of the motorcycle.

The lens 23 and the bulb 22 are so designed as to exhibit such a general light distributing characteristic that when the angle of rotation is zero, the region of illumination (distributed light) A spreads leftward and rightward along the horizontal datum line HL as shown in FIG. 13. This region of illumination A can be obtained when, for example, a light adjusting plate for adjusting the direction of emission of light from the bulb 22 is provided in the bulb 22 and a front or rear surface of the lens 23 is formed integrally with a multiplicity of cylindrical lenslets or Fresnel lenslets. Although in the illustrated embodiment the lens 23 is employed in the form of a scattering lens, the present invention is not always limited to the use of the scattering lens.

Figure 3:
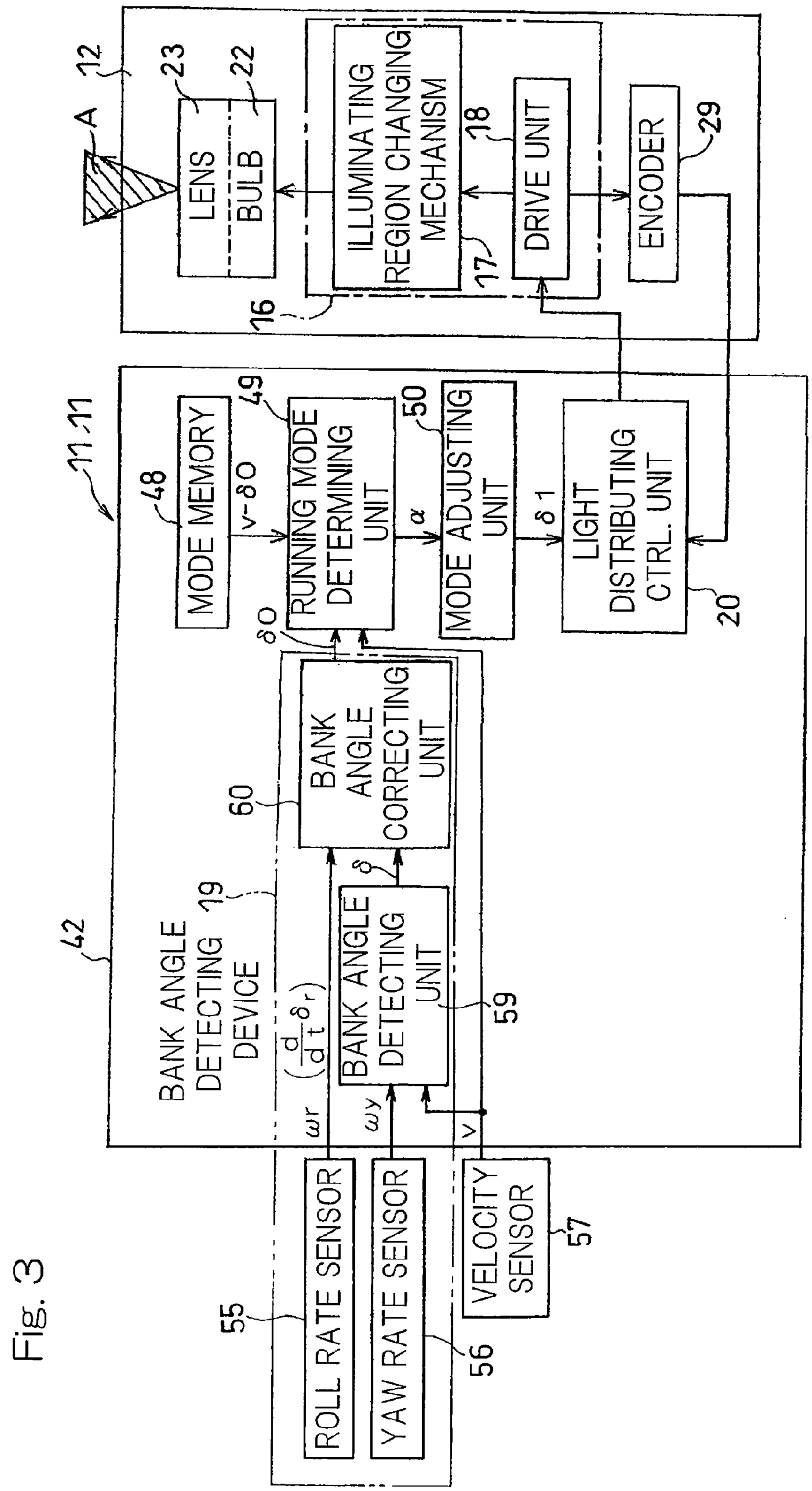
FIG. 3 is a circuit block diagram showing a schematic construction of the headlight device.

As best shown in FIG. 3, the headlight device 11 includes a bank angle detecting device 19 for detecting the angle of rotation of the motorcycle about a longitudinal axis or forward and rearward axis of the motorcycle, that is, the bank angle and for subsequently outputting an estimated bank angle δ0; a mode memory 48 for storing modes to adjust the estimated bank angle δ0 according to one of the normal running mode, sports running mode and slow running mode; a running mode determining unit 49 and a mode correcting unit 50; and a light distribution control unit 20 activated in response to the adjusted bank angle δ1 fed from the mode correcting unit 50. The details of each of the bank angle detecting device 19, the mode memory 48, the running mode determining unit 49 and the mode correcting unit 50 will be described later. The light distribution control unit 20 is operable in response to a feedback signal from the encoder 29 to control the drive unit 18 of the headlamp module 12 so that the bulb 22 and the lens 23 can be rotated through the illuminating region changing mechanism 17.

The bank angle detecting device 19 in turn includes a roll rate sensor 55 for detecting the angular velocity ω r (roll rate) of the motorcycle about the longitudinal axis of the motorcycle body; a yaw rate sensor 56 for detecting the angular velocity ωy (yaw rate) of the motorcycle about an vertical axis of the motorcycle body; a bank angle detecting unit 59 for detecting a motorcycle bank angle δ for calibration use from the yaw rate ωr and the traveling velocity v fed from a velocity sensor 57; and a bank angle correcting unit 60 for correcting a basic motorcycle bank angle δr determined by an output of the roll rate sensor 55, so as to approach the motorcycle bank angle δ for calibration use. Each of the roll rate sensor 55 and the yaw rate sensor 56 is, for example, a gyro.

Figure 4:
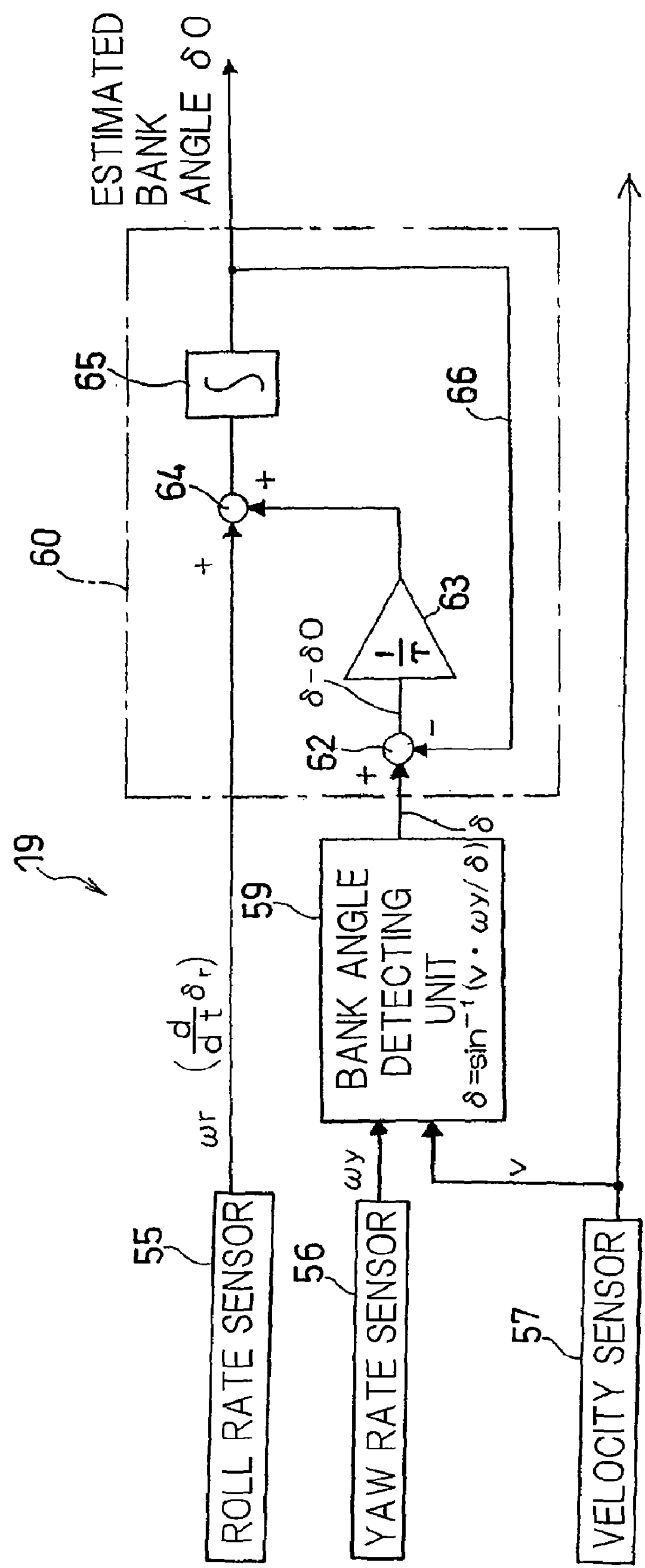
FIG. 4 is a circuit block diagram showing a schematic construction of the bank angle detecting unit.

The details of the bank angle detecting device 19 is shown in FIG. 4. The roll rate ωr detected by the roll rate sensor 55, when integrated, gives rise to the basic motorcycle bank angle δr to be determined, but integration of the roll rate ωr tends to be affected by a zero point offset and/or an integration error, thus lacking the reliability. In view of this, in the practice of the present invention, while the roll rate sensor 55 is principally used, it is collaterally corrected by the bank angle detecting unit 59. In other words, arrangement has been made so that the roll rate ωr and the motorcycle bank angle δ for correction are processed by the bank angle correcting unit 60 to provide the estimated bank angle δ0.

Figure 5:
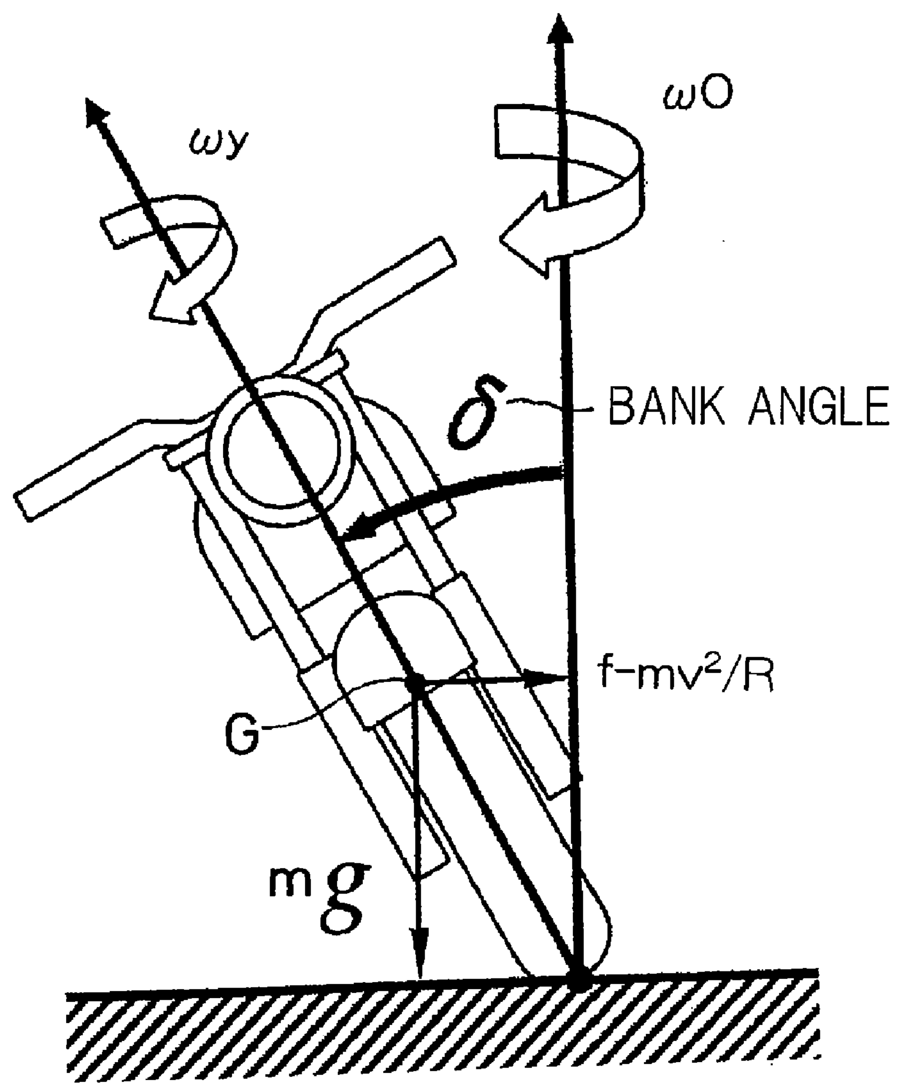
FIG. 5 is a schematic front elevational view showing the motorcycle held in a banked condition.

In the first place, the manner of detecting the motorcycle bank angle δ by means of the bank angle detecting unit 59 will be described. Assuming that the radius of turn of the motorcycle is expressed by R and the gravitational acceleration is expressed by g, and when the angular velocity (yaw rate in the fixed coordinate system) of the motorcycle within a horizontal plane as shown in FIG. 5 is expressed by ω0, the yaw rate ωy at the motorcycle bank angle δ for calibration use will be as follows:

$$\omega y = \omega 0 \cdot \cos \delta \tag{2}$$

On the other hand, the centrifugal force f acting on the center of gravity G of the motorcycle will be expressed by the following equation (3) if the mass of the motorcycle which is a total mass of the motorcycle body and the rider is expressed by m:

$$f = m \cdot v \cdot v / R \tag{3}$$

Since the angular velocity ω0 can be expressed as follows:

$$\omega 0 = v / R \tag{4}$$

Substituting the equation (4) into the equation (3) results in the following centrifugal force f acting on the motorcycle:

$$f = m \cdot v \cdot \omega 0 \tag{5}$$

Also, at the motorcycle bank angle δ for calibration use, such a relation as expressed by the following equation (6) establishes between the centrifugal force f acting on the motorcycle body, and the gravitational force m·g.

$$\tan \delta = f / (m \cdot g) \tag{6}$$

Substituting the equation (5) into the equation (6) results in the following equation (7):

$$\begin{aligned} \tan\delta &= m \cdot v \cdot \omega 0 / (m \cdot g) \\ &= v \cdot \omega 0 / g \end{aligned} \tag{7}$$

The equation (7) can be modified as follows when the parameter δ0 in the equation (2) above is substituted into the equation (7):

$$\tan \delta = v \cdot \omega y / (g \cdot \cos \delta) \tag{8}$$

From the equation (8) above, the relation expressed by the following equation (9) can be obtained, from which the motorcycle bank angle δ for calibration use can be expressed by the following equation (10):

$$\sin \delta = v \cdot \omega y / (g \cdot \cos \delta) \tag{9}$$

$$\delta = \sin^{-1}(v \cdot \omega y / g) \tag{10}$$

The bank angle detecting unit 59 shown in FIG. 4 calculates the motorcycle bank angle δ for calibration use by inputting the yaw rate ωy, detected by the yaw rate sensor 56 and the traveling velocity v measured by the velocity sensor 57 to the equation (10) above.

The bank angle correcting unit 60 shown in FIG. 4 includes a subtracting circuit 62, a dividing circuit 63, an adding circuit 64, an integrating circuit 65 and a feedback path 66. The subtracting circuit 62 is operable to generate a difference (δ−δ0) between the motorcycle bank angle δ for calibration use, which is outputted from the bank angle detecting unit 59, and the estimated bank angle δ0 outputted from the integrating circuit 62. The dividing circuit 63 is operable to divide this difference (δ−δ0) by time T. The adding circuit 64 is operable to add the output from the dividing circuit 63 and an output from the roll rate sensor 55 together. The integrating circuit 65 is operable to integrate the output from the dividing circuit 63 and then to output the estimated bank angle δ0. The feedback path 66 is used to feedback the output 60 of the integrating circuit 65 to an negative input terminal of the subtracting circuit 62. Accordingly, the basic motorcycle bank angle δr determined by the output of the roll rate sensor 55 can be corrected so as to approach the motorcycle bank angle δ for calibration use that is detected by the bank angle detecting unit 59.

The bank angle detecting unit 59, the bank angle correcting unit 60, the mode memory 48, the running mode determining means 49, the mode correcting unit 50 and the light distribution control unit 20, all referred to above, are built in a control unit 42 shown in FIG. 3, which is in turn arranged below a motorcycle seat assembly 40 as shown in FIG. 1. The roll rate sensor 55 and the yaw rate sensor 56 are disposed in the vicinity of the center of gravity G determined by a combination of the motorcycle body and a motorcycle rider.

With the circuit configuration discussed above, when the division of 1/T is performed in the dividing circuit 63 shown in FIG. 4, decrease of the time T results in increase of the output of δ−δ0, which is divided by the time T, and, therefore, the weight of the output δ from the bank angle detecting unit 59, that is, the weight of the yaw rate sensor 56 increases. Accordingly, a drift (deviation) of the bank angle δ0, which is an output of the integrating circuit 65, can be suppressed. On the other hand, increase of the time T results in decrease of the output of the bank angle detecting unit 59, which is divided by the time T, and, therefore, the weight of the roll rate ωr increases when it is added to the output of the roll rate sensor 55 by means of the adding circuit 64. Accordingly, a change or fluctuation of the estimated bank angle δ0, which is the output from the integrating circuit 65, at a short cycle can be suppressed. The time T, although variable depending on the sensitivity of the gyro, is chosen to be within the range of, for example, about 0.5 to 5 seconds and preferably within the range of about 1 to 2 seconds. Where the drift of the roll rate ω0 is considerable, the time T may be of a reduced value and, on the other hand, correction taking place in the bank angle correcting unit 60 has to be frequently carried out. Where the roll sensor 55 of a type, in which the drift is small, is employed, influences, which would be brought about by the drift, can be minimized or substantially eliminated and, therefore, the time T may be of a large value to allow the correction to be performed less frequently.

Figure 6:
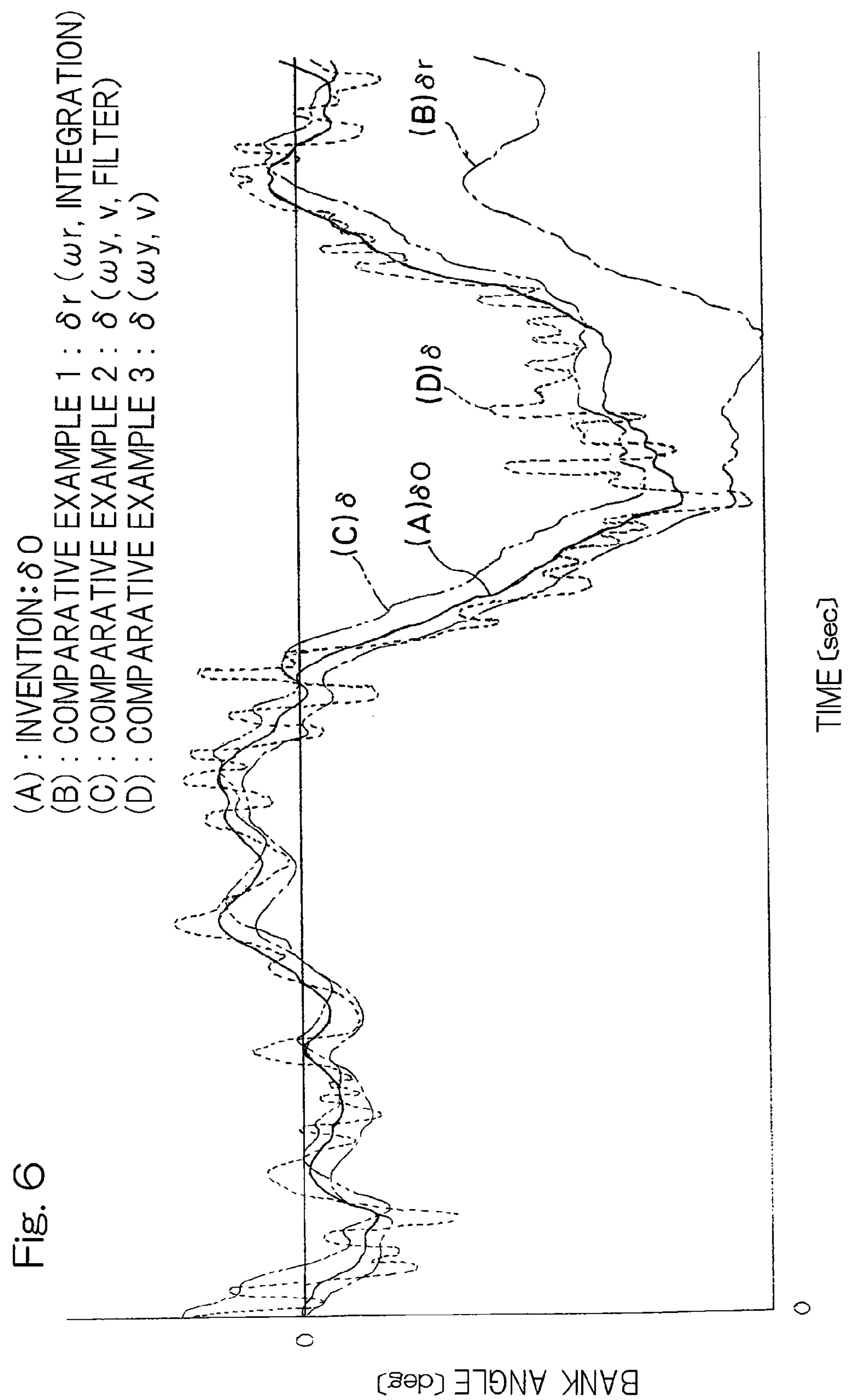
FIG. 6 is a chart of estimated bank angle data, obtained from the bank angle detecting device according to the present invention, shown in comparison with comparative data.
Figure 7:
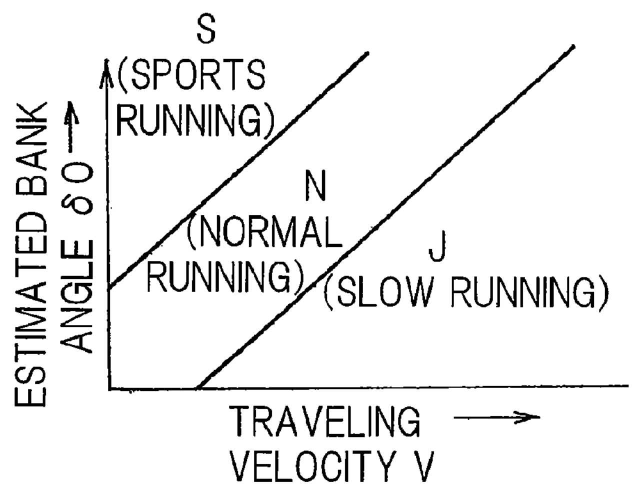
FIG. 7 is a chart showing the correlation between the traveling velocity and the estimated bank angles, illustrating a mode table stored in a mode memory.

FIG. 6 illustrates a chart of estimated bank angle data, obtained from the bank angle detecting device 19, shown in comparison with comparative data. As a comparative example 1, the motorcycle bank angle δr obtained by integration of the roll rate ωr, is shown by the single-dotted chain line B in FIG. 6. This basic motorcycle bank angle δr exhibits a smooth movement as is the case with the actual bank angle, but a drift from the actual value increases with passage of time due to an integration error or the like.

Also, in a comparative example 2, in which filtering is performed to remove a change of the motorcycle bank angle δ for calibration use, which has been calculated from the yaw rate ωr and the traveling velocity v, a delay in time occurs as shown by the double-dotted chain line C. As a result, rotation of the lens 23 and the bulb 22, both forming respective parts of the headlamp module 12 shown in FIG. 2, tends to be delayed, resulting in an unnatural or uncomfortable sensation to the motorcycle rider.

Also, the motorcycle bank angle δ for calibration use, which has been calculated from the equation (1) above, that is, from the yaw rate ωy and the traveling velocity v exhibits a considerable change at a short cycle responsive to change in time as shown by the broken line D in FIG. 6 as a comparative example 3. Accordingly, if based on the motorcycle bank angle δ for calibration use, the lens 23 and the bulb 22 of the headlamp module 12 shown in FIG. 2 are rotated about the center axis C by an angle, corresponding to the value of the motorcycle bank angle δ for calibration use, in a direction counter to the direction in which the motorcycle banks, the lens 23 and the bulb 22 undergo strenuous repeated rotation, resulting in an unnatural or uncomfortable sensation to the motorcycle rider.

In contrast thereto, the estimated bank angle δ0 obtained through the bank angle detecting device 19 shown in FIG. 4 represents a result corresponds to a combination of advantages of the motorcycle bank angle δ for calibration use, which is calculated from the yaw rate ωy and the traveling velocity v as shown by the broken line D, and the basic motorcycle bank angle δr, in which the roll rate ωr is integrated as shown by the single-dotted chain line B. As a result that the drift from the actual bank angle is small and the change at the short cycle is minimized, the operation of the lens 23 and the bulb 22 of the headlamp module 12 shown in FIG. 12 comes to be smooth and accurate, thus allowing the motorcycle rider not to feed unnatural and uncomfortable.

In the next place, the mode memory 48, the running mode determining means 40 and the mode correcting unit 50, all forming respective parts of the headlight device 11 shown in FIG. 3, will be described in detail. They are employed for correction of the estimated bank angle δ0 according to the running mode. Separate from the motorcyclist's riding attitude, it is preferred that the region of illumination of the headlamp can be adjusted according to one of the three running modes that broadly includes a normal running mode N, in which the motorcycle is driven at a normal speed; a sports running mode S, in which the motorcycle is driven at a high speed; and a slow running mode J, in which the motorcycle is driven at a slow speed. In consideration thereof, the mode memory 48 referred to above stores therein mode tables descriptive of correlations between the traveling velocity v and the estimated bank angle δ0 for each of the three running modes S, N and J.

The running mode determining means 49 shown in FIG. 3 is operable to determine the running mode by comparing the bank angle detecting device 19 with the mode table referred to above and then to output, as a result of such determination, a correction value α that is preset for each of the running modes. This correction value α is set to a factor of 2 in the case of the sports running mode S; to a factor of 1.7 in the case of the normal running mode N; and to a factor of 1 to 1.5 in the case of the slow running mode. The mode angle correcting unit 50 is operable to multiply the estimated bank angle $\delta 0$ by the correction value $\alpha$ to thereby output a corrected bank angle $\delta 0 \cdot \alpha = \delta 1$.

Figure 8:
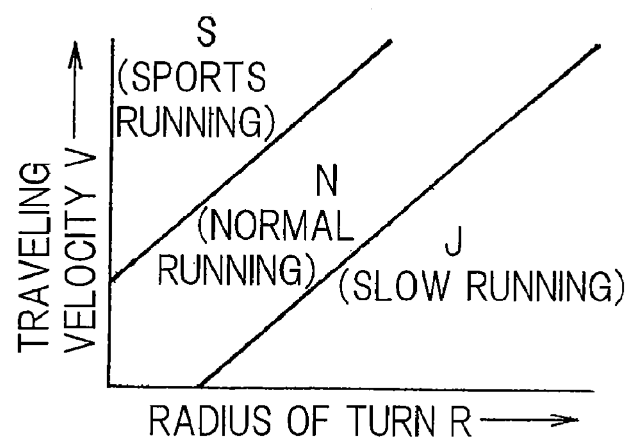
FIG. 8 is a chart showing the correlation between the radius of turn and the traveling velocities, illustrating a mode table stored in a mode memory.
Figure 9:
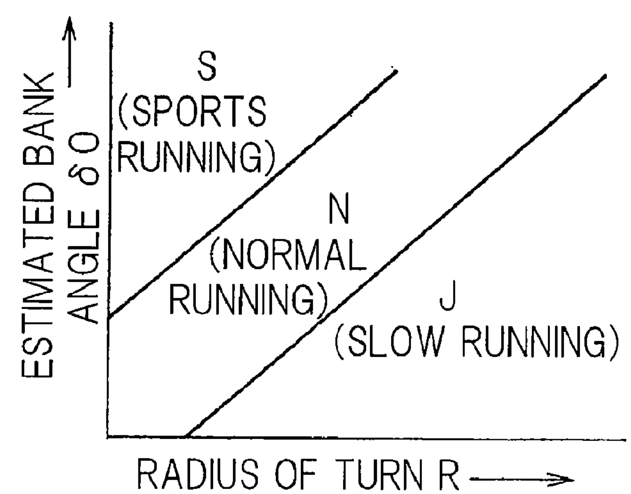
FIG. 9 is a chart showing the correlation between the radius of turn and the estimated bank angles, illustrating a mode table stored in a mode memory.

FIG. 8 illustrates the correlation between the traveling velocity v and the radius of turn R relative to the three running modes S, N and J, and they are stored beforehand as a mode table in the mode memory 48. In such case, the running mode determining means 49 compares the radius of turn R and the traveling velocity v with the mode table in the mode memory 48 to determine the running mode. Also, FIG. 9 illustrates the correlation between the radius of turn R and the estimated bank angle $\delta 0$ relative to the three running modes S, N and J and this is stored beforehand as a mode table in the mode memory 48 shown in FIG. 3. In such case, the running mode determining means 48 compares the radius of turn R and the estimated bank angle $\delta 0$ with the mode table in the mode memory 48 to determine the running mode. In accordance with each of those running modes, the estimated bank angle $\delta 0$ is automatically corrected to suit the running mode.

As hereinabove described, since thanks to those three correlations described above, one of the normal running mode, the sports running mode and the slow running mode is assumed by the motorcycle then running can be determined, the light distribution control unit 20 can automatically adjust the region of illumination properly to suit to the particular running mode. By way of example, during the sports running, in which the motorcycle rider tends to watch attentively in a further region forwardly of the motorcycle than that during the normal running, the region of illumination is turned a larger angle than that during the normal running, but during the slow running, the region of illumination is turned a smaller angle than that during the normal running.

Hereinafter, the operation of the motorcycle headlight device 11 of the structure in FIG. 3 will be described. When the motorcycle undergoes, for example, a leftward cornering during the travel at night, the estimated bank angle $\delta 0$ outputted from the bank angle detecting device 19 is corrected by the mode correcting unit 50 based on the correction value $\alpha$ so that the light distribution control unit 20 can control the drive unit 18 based on the corrected bank angle $\delta 1$ which has been so corrected. Accordingly, by allowing the lens 23 and the bulb 22 to be turned clockwise or in a direction counter to the direction in which the motorcycle has banked, the region of illumination (distributed light) A is turned an angle equal to the corrected bank angle $\delta 1$ in a direction counter to that. When the amount of rotation of the drive unit 18, detected by the encoder 29, attains a value corresponding to the corrected bank angle $\delta 1$, the light distribution control unit 20 halts the drive unit 18 in response thereto.

Figure 12:
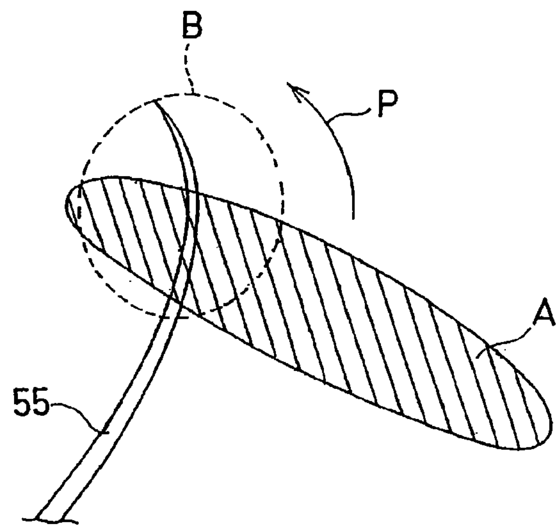
FIG. 12 is a schematic forward viewed diagram showing a region illuminated by the headlight device of the present invention during the cornering of the motorcycle.
Figure 14:
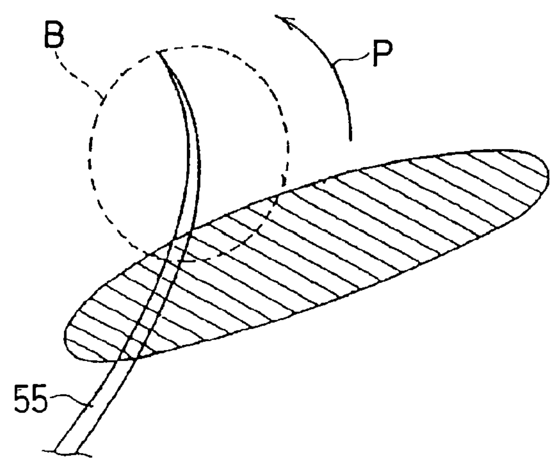
FIG. 14 is a schematic forward viewed diagram showing the region illuminated by the conventional headlight device during the cornering of the motorcycle.

Therefore, when the motorcycle changes its direction of travel towards, for example, a leftward direction shown by the arrow P along the curved lane 80 as shown in FIG. 12, the region of illumination A afforded by the headlight device 11 changes from the pattern, in which the illuminating region A extends leftwards and rightwards along the horizontal datum line H during the straight forward run of the motorcycle as shown in FIG. 13, to a pattern, in which the illuminating region A extends somewhat leftwardly upwardly as shown in FIG. 12. As a result, much light than that afforded with the conventional headlight device as shown in FIG. 14 can be distributed in an area inwardly of the direction, at which the rider's sight is aimed, (an area B encompassed by the broken circle in FIG. 12), allowing the motorcycle rider to enjoy an increased visibility. It is to be noted that depending on the shape of the illuminating region A, it may occur that the illuminating region A may be turned an angle corresponding to the corrected bank angle $\delta 1$ in a direction, not counter to, but identical with the direction, in which the motorcycle is banked, to thereby distribute an increased amount of light in an area of the rider's sight inwardly of the direction of turn of the motorcycle.

Figure 10:
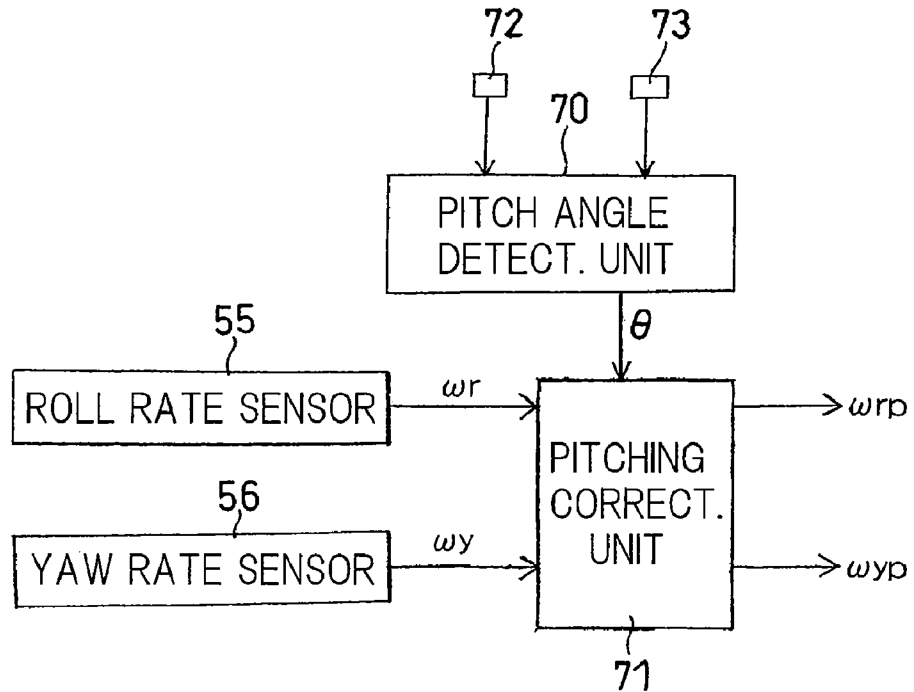
FIG. 10 is a block diagram showing a schematic construction according to a second preferred embodiment of the present invention, illustrating the relation among a pitch angle detecting unit, a roll rate detecting and a yaw rate detecting unit.
Figure 11:
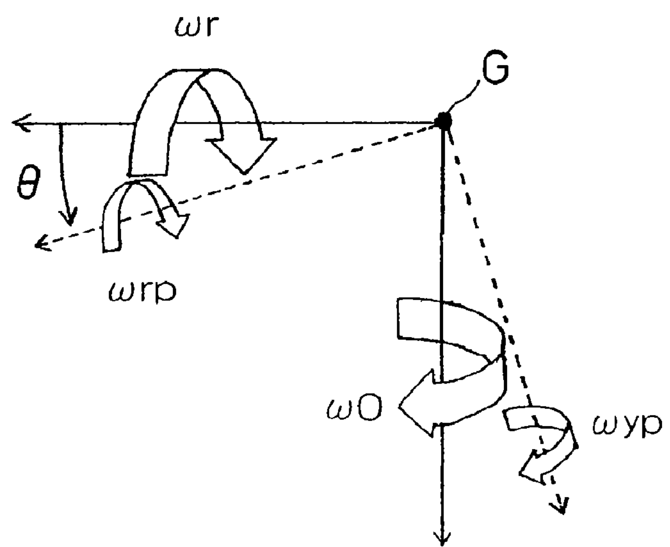
FIG. 11 is a vector diagram showing a pitch angle change of the roll rate and yaw rate in vehicle body coordinates and fixed coordinates.

FIG. 10 illustrates a second preferred embodiment of the present invention. Detection of the bank angle according to the previously described first embodiment is premised that the angular velocity of the motorcycle about the lateral axis, that is, the change in pitch angle is zero. However, where the change in pitch angle is large, the bank angle has to be detected in accordance with the manner which will now be described in connection with the second preferred embodiment of the present invention In the case of the motorcycle actually running, nose dive or nose lift tends to occur during the motorcycle being braked or during acceleration resulting from opening or closing of an accelerator during banking, respectively, accompanied by a considerable change in pitch angle $\theta$ as shown in FIG. 11. In particular, in the case of the sports running, the motorcycle tends to be banked during the cornering, after the motorcycle has been nose dived as a result of braked deceleration at the time of entry into the curve, and to be subsequently accelerated to worm out of the curve in a nose lifted condition. As a result, since the change in pitch is maximized at the start of banking or at the time of restoration to the upright posture, the bank angle estimating method according to the previously described first embodiment of the present invention has a problem in that the roll rate and the yaw rate are adversely affected enough to result in an error in bank angle detection.

In view of the above, in the circuit configuration shown in FIG. 10, the use is made of a pitch angle detecting unit 70 so that based on the pitch angle $\theta$ detected by the pitch angle detecting unit 70, coordinate conversion is carried out subject to $\omega r$ and $\omega y$, which are obtained from the roll rate sensor 55 and the yaw rate sensor 56, respectively, by means of a pitching correcting unit 71 to thereby determine an accurate roll rate and an accurate yaw rate occurring in the motorcycle body.

FIG. 11 illustrates a vector diagram showing the manner of change of the pitch angle in the roll rate and the yaw rate in motorcycle coordinate and fixed coordinate, respectively. As a result of pitching, the roll rate $\omega r$ and the yaw rate $\omega y$ in the fixed coordinate changes to eventually assume a pitching corrected roll rate $\omega rp$ and a pitching corrected yaw rate $\omega yp$ which can be obtained by the following respective equations (11) and (12):

$$\omega r = \omega rp \cdot \cos\theta - \omega yp \cdot \sin\theta \tag{11}$$

$$\omega r = \omega rp \cdot \sin\theta + \omega yp \cdot \cos\theta \tag{11}$$

As means for inputting information on pitching to the pitch angle detecting unit 70 shown in FIG. 10, the use may be made of a displacement sensor 72, disposed inside, for example, the front fork 4, which is a front wheel suspension unit shown in FIG. 1, and a displacement sensor 73 disposed inside the rear wheel suspension unit 15. From the difference in amount of telescopic motion between the displacement sensors 72 and 73, the angle $\theta$ of pitching about the lateral axis passing through the center of gravity G of the motorcycle is determined. In such case, since the existing suspension units 4 and 15 for the front and rear wheels, respectively, which are respective members employed in any existing motorcycle, can be employed, any possible increase of the number of component parts and the cost of manufacture can be advantageously suppressed.

Where those displacement sensors 72 and 73 are not used, the pitch angle detecting unit 70 shown in FIG. 10 can determine the pitch angle θ from an acceleration acting in the longitudinal direction or the forwards and rearwards direction, that is, in the direction conforming to the longitudinal sense of the motorcycle. In such case, data that are descriptive of relations between magnitudes of such acceleration and pitch angles, which have been determined beforehand, have to be prepared and, then the pitch angle θ is determined from the acceleration detected by the accelerator sensor 75 shown in FIG. 1. The acceleration sensor 76, when disposed in proximity to the center of gravity G, can give rise to a highly accurate pitch angle.

Although the bank angle detecting device of the present invention has been fully described as applied to the headlight device of the motorcycle, the present invention can be equally applied to any other application than the headlight device. By way of example, since if the bank angle is large when, for example, the motorcycle runs, wheel tires are susceptible to slippage, in order to avoid this, the present invention can be applied in limiting the engine torque according to the magnitude of the bank angle detected. The present invention can also be used in the application in which a motorcycle racer may examine the details of racing in reference to data descriptive of the bank angles measured during the racing, which have been stored in a drive recorder, and/or may refer to such details of racing for future use in subsequent racing. The present invention can yet be used in providing a warning signal to the motorcycle rider when the bank angle excessively increases during running on a slippery road surface under, for example, a rainy weather, thereby inviting the motorcycle rider to be attentive in motorcycle maneuvering on that occasion.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A bank angle detecting device for a motorcycle, which comprises:

- a roll rate sensor for detecting a angular velocity about a longitudinal axis of the motorcycle;
- a yaw rate sensor for detecting a angular velocity about a vertical axis of the motorcycle;
- a bank angle detecting unit for detecting a motorcycle bank angle for calibration use based on the angular velocity, detected by the yaw rate sensor, about the vertical axis of the motorcycle and a traveling velocity of the motorcycle; and
- a bank angle correcting unit for correcting a basic motorcycle bank angle, determined from an output of the yaw rate sensor, so as to approach the motorcycle bank angle for calibration use that is detected by the bank angle detecting unit, to thereby determine an estimated bank angle.

2. The bank angle detecting device for the motorcycle as claimed in claim 1, in which the bank angle correcting unit comprises a dividing circuit for dividing a difference between an output of the bank angle detecting unit and the estimated bank angle by time, an adding circuit for adding an output of the dividing circuit and the output of the roll rate sensor together, and an integrating circuit for integrating an output of the adding circuit to provide the estimated bank angle.

3. The bank angle detecting device for the motorcycle as claimed in claim 1, further comprising a pitch angle detecting unit for detecting pitch angle of the motorcycle about a lateral axis, and a pitching correcting unit for correcting the respective angular velocities about the vertical axis and the longitudinal axis based on the pitch angle about the lateral axis, which has been detected by the pitch angle detecting unit.

4. The bank angle detecting device for the motorcycle as claimed in claim 3, in which the pitch angle detecting unit determines the pitch angle about the lateral axis from an amount of telescopic motion of a suspension unit for each of front and rear wheels of the motorcycle.

5. The bank angle detecting device for the motorcycle as claimed in claim 3, in which the pitch angle detecting unit determines the pitch angle about the lateral axis from a acceleration in a direction of motorcycle travel.

6. A headlight device for a motorcycle, which comprises:

- a bank angle detecting device as defined in claim 1;
- a headlamp module for illuminating an area forwardly of the motorcycle;
- a light distribution adjusting mechanism for changing a region of illumination afforded by the headlamp module; and
- a light distribution control unit for controlling the light distribution adjusting mechanism based on the estimated bank angle to thereby change the region of illumination to allow the headlamp module to illuminate a further region inwardly of a direction of turn during cornering of the motorcycle.

7. The headlight device for the motorcycle as claimed in claim 6, in which the light distribution control unit controls the light distribution adjusting mechanism based on a correlation between the traveling velocity and the estimated bank angle, in addition to the estimated bank angle.

8. The headlight device for the motorcycle as claimed in claim 6, in which the light distribution control unit controls the light distribution adjusting mechanism based on a correlation between a radius of turn and the traveling velocity, in addition to the estimated bank angle.

9. The headlight device fort the motorcycle as claimed in claim 6, in which the light distribution control unit controls the light distribution adjusting mechanism based on a correlation between a radius of turn and the estimated bank angle, in addition to the estimated bank angle.

10. The headlight device for the motorcycle as claimed in claim 6 in which the light distribution control unit comprises a running mode determining unit that determines the running mode based on a correlation between the traveling velocity and the estimated bank angle and a mode a adjusting unit that adjusts the light distribution control unit based on the running mode determined by the running mode determining unit.

11. The headlight device for the motorcycle as claimed in claim 6 in which the light distribution control unit comprises a running mode determining unit that determines the running mode based on a correlation between a radius of turn and the traveling velocity and a mode adjusting unit that adjusts the light distribution control unit based on the running mode determined by the running mode determining unit.

12. The headlight device for the motorcycle as claimed in claim 6 in which the light distribution control unit comprises a running mode determining unit that determines the running mode based on a correlation between a radius of turn and the estimated bank angle and a mode adjusting unit that adjusts the light distribution control unit based on the running mode determined by the running mode determining unit.

13. A bank angle detecting device for a motorcycle, which comprises:

a roll rate sensor for detecting an angular velocity about a longitudinal axis of the motorcycle;

a yaw rate sensor for detecting an angular velocity about a vertical axis of the motorcycle;

a velocity sensor for detecting a traveling velocity of the motorcycle;

a bank angle detecting unit for detecting a motorcycle bank angle for calibration use based on the angular velocity, detected by the yaw rate sensor, about the vertical axis of the motorcycle and the traveling velocity of the motorcycle, detected by the velocity sensor;

a bank angle correcting unit for correcting a basic motorcycle bank angle, determined from an output of the roll rate sensor, so as to approach the motorcycle bank angle for calibration use that is detected by the bank angle detecting unit, to thereby determine an estimated bank angle;

a pitch angle detecting unit for detecting a pitch angle of the motorcycle about a lateral axis; and a pitching correcting unit for correcting the respective angular velocities about the vertical axis and the longitudinal axis based on the pitch angle about the lateral axis, which has been detected by the pitch angle detecting unit.

14. The bank angle detecting device for a motorcycle as claimed in claim 13, in which the pitching correcting unit corrects the respective angular velocities about the vertical axis and the longitudinal axis by calculating new angular velocities in a shifted coordinate system of the motorcycle rotated by the pitch angle about the lateral axis.

15. The bank angle detecting device for the motorcycle as claimed in claim 14, in which the pitch angle detecting unit determines the pitch angle about the lateral axis from an amount of telescopic motion of a suspension unit for each of front and rear wheels of the motorcycle.

16. The bank angle detecting device for the motorcycle as claimed in claim 14, in which the pitch angle detecting unit determines the pitch angle about the lateral axis from an acceleration in a direction of motorcycle travel.

* * * * *